United States Patent
Liao et al.

(10) Patent No.: US 12,478,436 B2
(45) Date of Patent: Nov. 25, 2025

(54) SMART IMAGE NAVIGATION FOR INTRACARDIAC ECHOCARDIOGRAPHY

(71) Applicant: Siemens Medical Solutions USA, Inc., Malvern, PA (US)

(72) Inventors: Rui Liao, Princeton Junction, NJ (US); Young-Ho Kim, West Windsor, NJ (US); Jarrod Collins, Houston, TX (US); Abdoul Aziz Amadou, London (GB); Sebastien Piat, Lawrence Township, NJ (US); Ankur Kapoor, Plainsboro, NJ (US); Tommaso Mansi, Plainsboro, NJ (US); Noha El-Zehiry, Plainsboro, NJ (US); Sasa Grbic, Plainsboro, NJ (US); Dorin Comaniciu, Princeton, NJ (US); Xianjun S. Zheng, Plainsboro, NJ (US); Bo Liu, New Brunswick, NJ (US); Zhoubing Xu, Plainsboro, NJ (US); Jin-Hyeong Park, Princeton, NJ (US)

(73) Assignee: Siemens Medical Solutions USA, Inc., Malvern, PA (US)

( * ) Notice: Subject to any disclaimer, the term of this patent is extended or adjusted under 35 U.S.C. 154(b) by 555 days.

(21) Appl. No.: 17/456,458

(22) Filed: Nov. 24, 2021

(65) Prior Publication Data

US 2023/0157761 A1     May 25, 2023

(51) Int. Cl.
*A61B 34/20*     (2016.01)
*A61B 34/00*     (2016.01)
*A61B 34/32*     (2016.01)

(52) U.S. Cl.
CPC ............ *A61B 34/20* (2016.02); *A61B 34/25* (2016.02); *A61B 34/32* (2016.02); *A61B 2034/2063* (2016.02)

(58) Field of Classification Search
CPC ......... A61B 34/20; A61B 34/25; A61B 34/32; A61B 2034/2063
See application file for complete search history.

(56) References Cited

U.S. PATENT DOCUMENTS

| | | | |
|---|---|---|---|
| 2014/0147027 A1 | 5/2014 | Jain et al. | |
| 2018/0032841 A1* | 2/2018 | Kluckner | G16H 40/63 |

(Continued)

FOREIGN PATENT DOCUMENTS

| | | |
|---|---|---|
| JP | 2014518123 A | 7/2014 |
| JP | 2019501703 A | 1/2019 |
| JP | 2021515647 A | 6/2021 |

OTHER PUBLICATIONS

Loschak et al., "A four degree of freedom robot for positioning ultrasound imaging catheters," Journal of Mechanisms and Robotics, vol. 8, No. 5, 2016, pp. 051016-1-051016-9.

(Continued)

*Primary Examiner* — Rochelle D Turchen

(57) ABSTRACT

Systems and methods for automatically navigating a catheter in a patient are provided. An image of a current view of a catheter in a patient is received. A set of actions of a robotic navigation system for navigating the catheter from the current view towards a target view is determined using a machine learning based network. The catheter is automatically navigated in the patient from the current view towards the target view using the robotic navigation system based on the set of actions.

11 Claims, 13 Drawing Sheets

(56) References Cited

U.S. PATENT DOCUMENTS

| | | | |
|---|---|---|---|
| 2018/0353240 A1 | 12/2018 | Florent et al. | |
| 2020/0297444 A1* | 9/2020 | Camarillo | G16H 30/40 |
| 2021/0000446 A1 | 1/2021 | Toporek et al. | |
| 2021/0145412 A1 | 5/2021 | Mansi et al. | |

OTHER PUBLICATIONS

Liao et al., "An Artificial Agent for Robust Image Registration," AAAI Conference on Artificial Intelligence. 2017. pp. 4168-4175.

Alkhouli, "Intracardiac Echocardiography in Structural Heart Disease Interventions", JACC: Cardiovascular Interventions, 2018, pp. 2133-2147.

Hester et al., "Deep Q-learning from Demonstrations", AAAI Conference on Artificial Intelligence. 2018, 8 pgs.

Zei, "Basic Intracardiac Ultrasound (ICE) in Electrophysiology", Brigham and Women's Hospital, https://www.youtube.com/watch?v=kQLC8rUpnSo), 2020.

Enriquez et al., "Use of Intracardiac Echocardiography in Interventional Cardiology Working With the Anatomy Rather Than Fighting It", Circulation, 2018. pp. 2278-2294.

Lu et al., "Automatic view planning for cardiac MRI acquisition," 2011, Medical Image Computing and Computer-Assisted Intervention, pp. 479-486.

Alansary et al., "Automatic view planning with multi-scale deep reinforcement learning agents," 2018, Medical Image Computing and Computer Assisted Intervention, pp. 277-285.

Hou et al., "Predicting slice-to-volume transformation in presence of arbitrary subject motion," 2017, Medical Image Computing and Computer-Assisted Intervention, pp. 296-304.

Zhang et al., "Task Driven Generative Modeling for Unsupervised Domain Adaptation: Application to X-Ray Image Segmentation," 2018, International Conference on Medical Image Computing and Computer-Assisted Intervention, 9 pgs.

Miao et al., "Dilated FCN for Multi-Agent 2D/3D Medical Image Registration," 2018, Thirty-Second AAAI Conference on Artificial Intelligence, pp. 4694-4701.

Toth et al., "3D/2D model-to-image registration by imitation learning for cardiac procedures," 2018, International Journal of Computer Assisted Radiology and Surgery vol. 13, pp. 1141-1149.

* cited by examiner

FIG 9
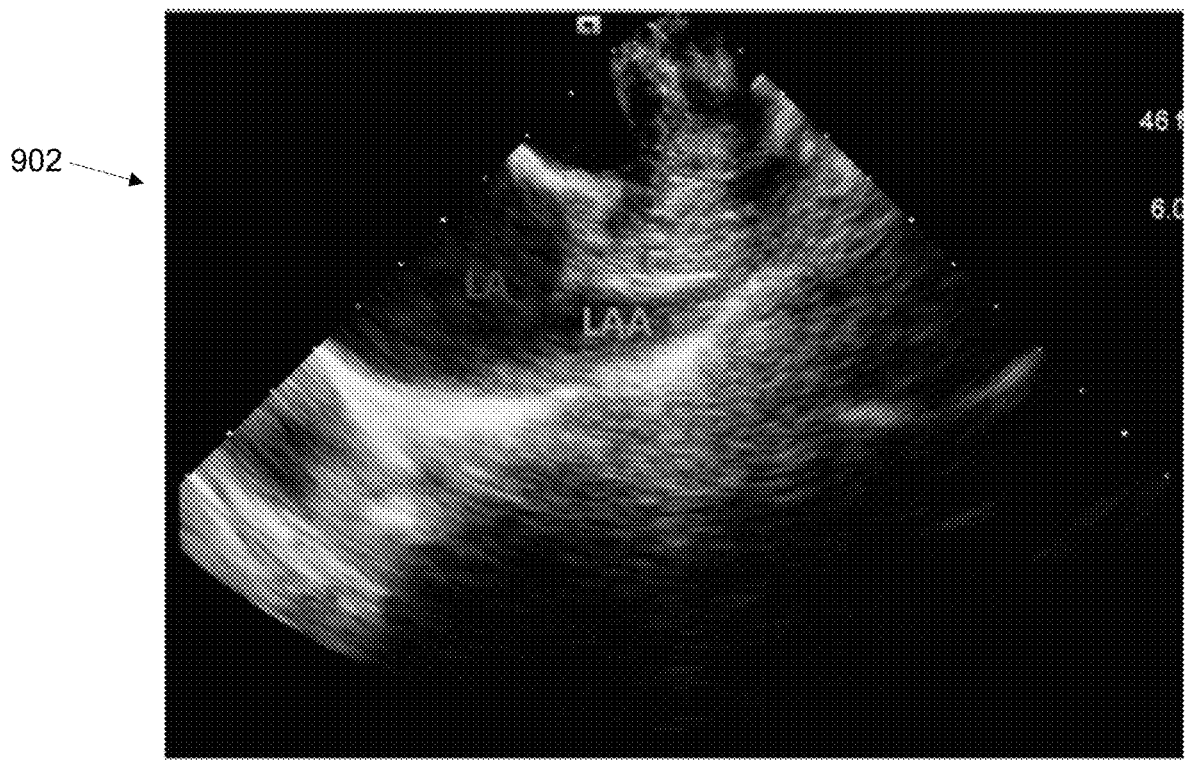
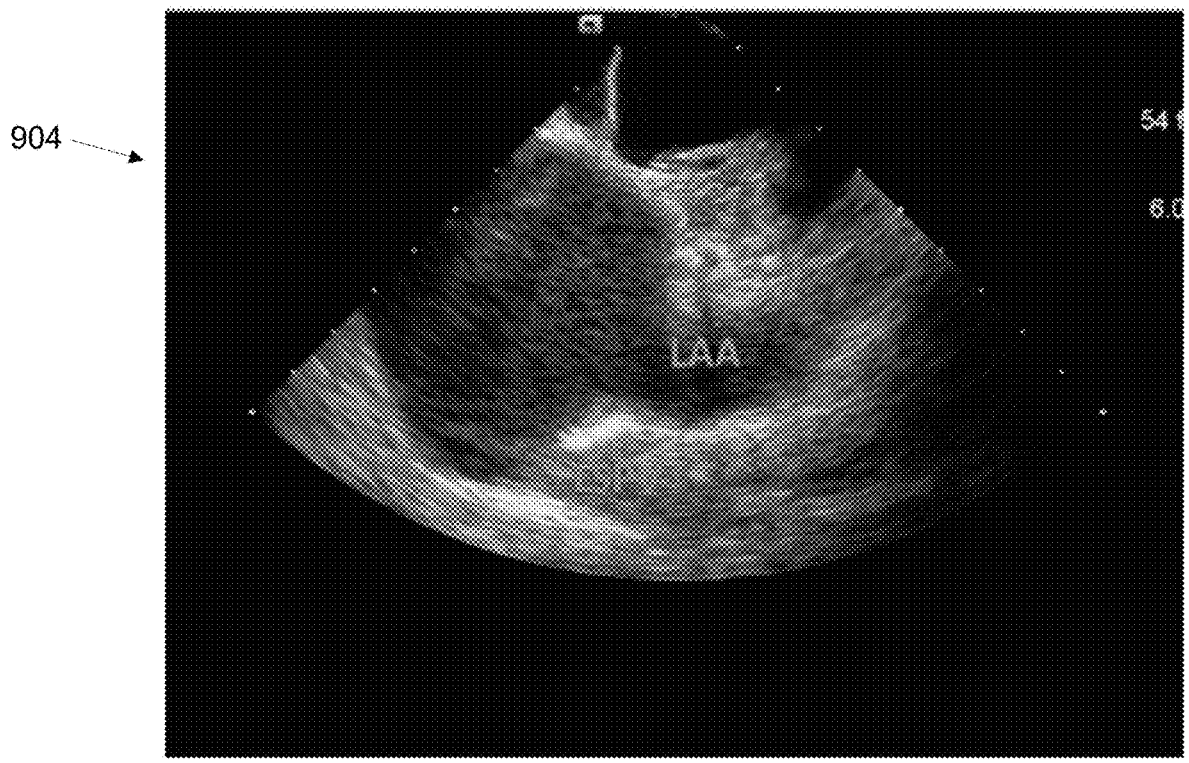

FIG 10
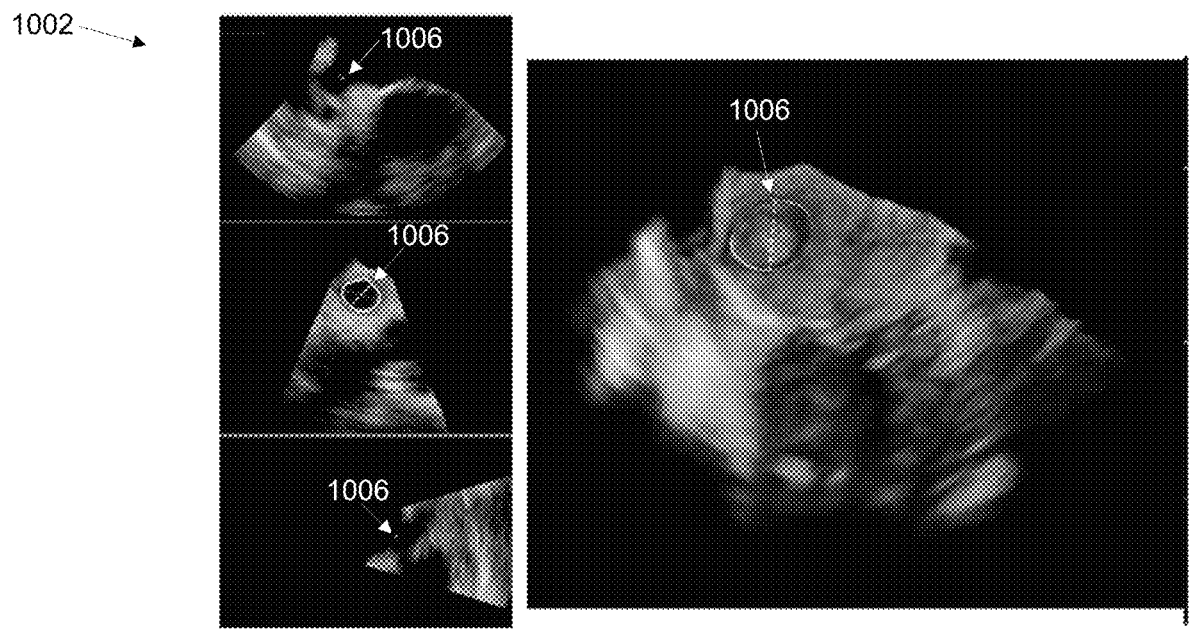
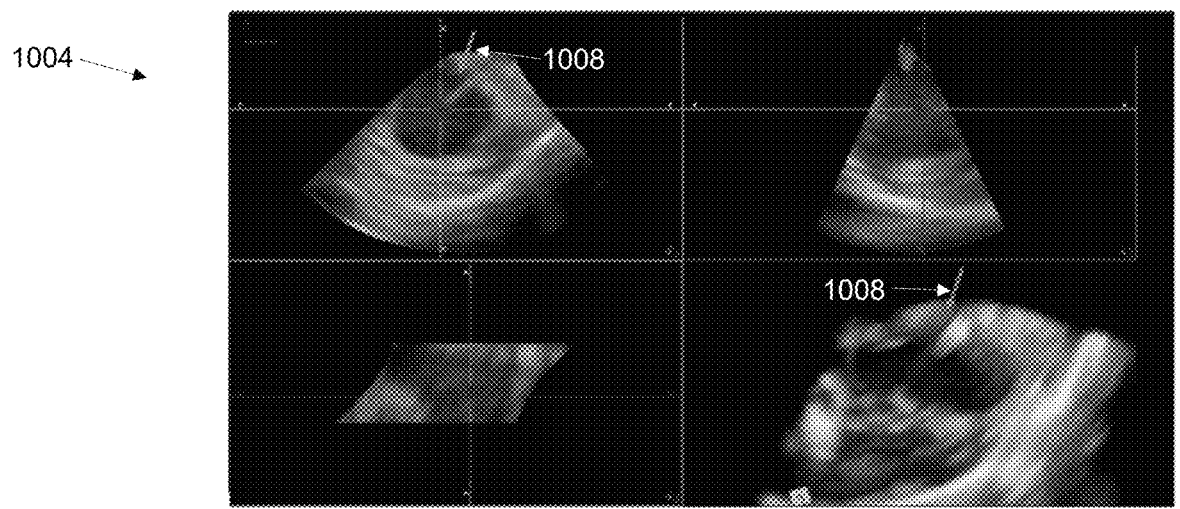

SMART IMAGE NAVIGATION FOR INTRACARDIAC ECHOCARDIOGRAPHY

TECHNICAL FIELD

The present invention relates generally to smart image navigation for ICE (intracardiac echocardiography), and in particular to automatic navigation of catheters for ICE.

BACKGROUND

ICE (intracardiac echocardiography) is an established imaging modality for cardiac electrophysiology procedures. ICE enables the operator to visualize cardiac anatomy, blood flow, and devices without general anesthesia and is therefore well suited for therapy guidance and adverse event detection and monitoring. Despite these advantages, ICE is used only sporadically during electrophysiology procedures. This is due to the complexity to performing ICE, the limited field-of-view of the ICE catheter, the requirement of two operators during the ICE procedure, and the demands of extensive training for effective manipulations and imaging.

BRIEF SUMMARY OF THE INVENTION

In accordance with one or more embodiments, systems and methods for automatically navigating a catheter in a patient are provided. An image of a current view of a catheter in a patient is received. A set of actions of a robotic navigation system for navigating the catheter from the current view towards a target view is determined using a machine learning based network. The catheter is automatically navigated in the patient from the current view towards the target view using the robotic navigation system based on the set of actions.

In one embodiment, a preoperative medical image of a patient is received. A first registration between the preoperative medical image and the image of the current view of the catheter is performed. A second registration between the preoperative medical image and an image of a view of the catheter navigated to a predefined position in the patient is received. The set of actions of the robotic navigation system for navigating the catheter from the current view towards a view corresponding to the preoperative medical image is determined based on the first registration and the second registration. The preoperative medical image is a medical image acquired for planning the same medical procedure for which the catheter is automatically navigated.

In one embodiment, a selection of a saved medical image of one or more saved medical images is received. A path in a graph from a first vertex representing a configuration of the robotic navigation system corresponding to the image of the current view of the catheter to a second vertex representing a configuration of the robotic navigation system corresponding to the selected saved medical image is determined. The set of actions of the robotic navigation system for navigating the catheter from the current view towards a view depicted in the selected saved medical image is determined based on the determined path. The one or more saved medical images were saved during the same medical procedure for which the catheter is automatically navigated. The graph is generated as a user navigates the catheter by adding a vertex to the graph in response to receiving user input.

In one embodiment, one or more images depicting standard anatomical views of the patient are received. The set of actions of the robotic navigation system for navigating the catheter from the current view towards a view depicted in the one or more images is determined. The one or more images depicting standard anatomical views comprise clinically significant views.

In one embodiment, the image of the current view is compared to an image of the target view to determine a similarity measure. The receiving, the determining, and the automatically navigating are repeated until a similarity threshold is satisfied.

In one embodiment, at least one of classification of current view of the catheter or identification of one or more anatomical objects of interest in the current view of the catheter are performed. The at least one of the classification of the current view of the catheter or the identification of the one or more anatomical objects of interest are identified in the current view of the catheter.

These and other advantages of the invention will be apparent to those of ordinary skill in the art by reference to the following detailed description and the accompanying drawings.

BRIEF DESCRIPTION OF THE DRAWINGS

FIG. 9 shows exemplary views of a catheter with anatomical objects of interest labelled thereon, in accordance with one or more embodiment;

FIG. 10 shows exemplary views of a catheter with live quantification of patient anatomy and live tracking of therapy devices identified thereon, in accordance with one or more embodiment;

DETAILED DESCRIPTION

The present invention generally relates to methods and systems for smart image navigation for ICE (intracardiac echocardiography). Embodiments of the present invention are described herein to give a visual understanding of such methods and systems. A digital image is often composed of digital representations of one or more objects (or shapes). The digital representation of an object is often described herein in terms of identifying and manipulating the objects. Such manipulations are virtual manipulations accomplished in the memory or other circuitry/hardware of a computer system. Accordingly, it is to be understood that embodiments of the present invention may be performed within a computer system using data stored within the computer system.

The present invention generally relates to automatic control of robotic catheter navigation systems to navigate a catheter towards a target view depicted in a medical image of a patient during a medical procedure. As used herein, a view depicted in a medical image refers to the depiction of the medical image. Accordingly, by navigating a catheter towards a target view depicted in a medical image, the catheter is navigated so that the view of the catheter is substantially the same as the target view depicted in the medical image. Various embodiments described herein provide for the target view being a view depicted in a preoperative planning medical image, a view depicted in a bookmarked medical image previously acquired during the medical procedure, or a standard anatomically significant view. Advantageously, embodiments described herein provide for efficient, precise, and reproducible view recovery and finding.

Figure 1:
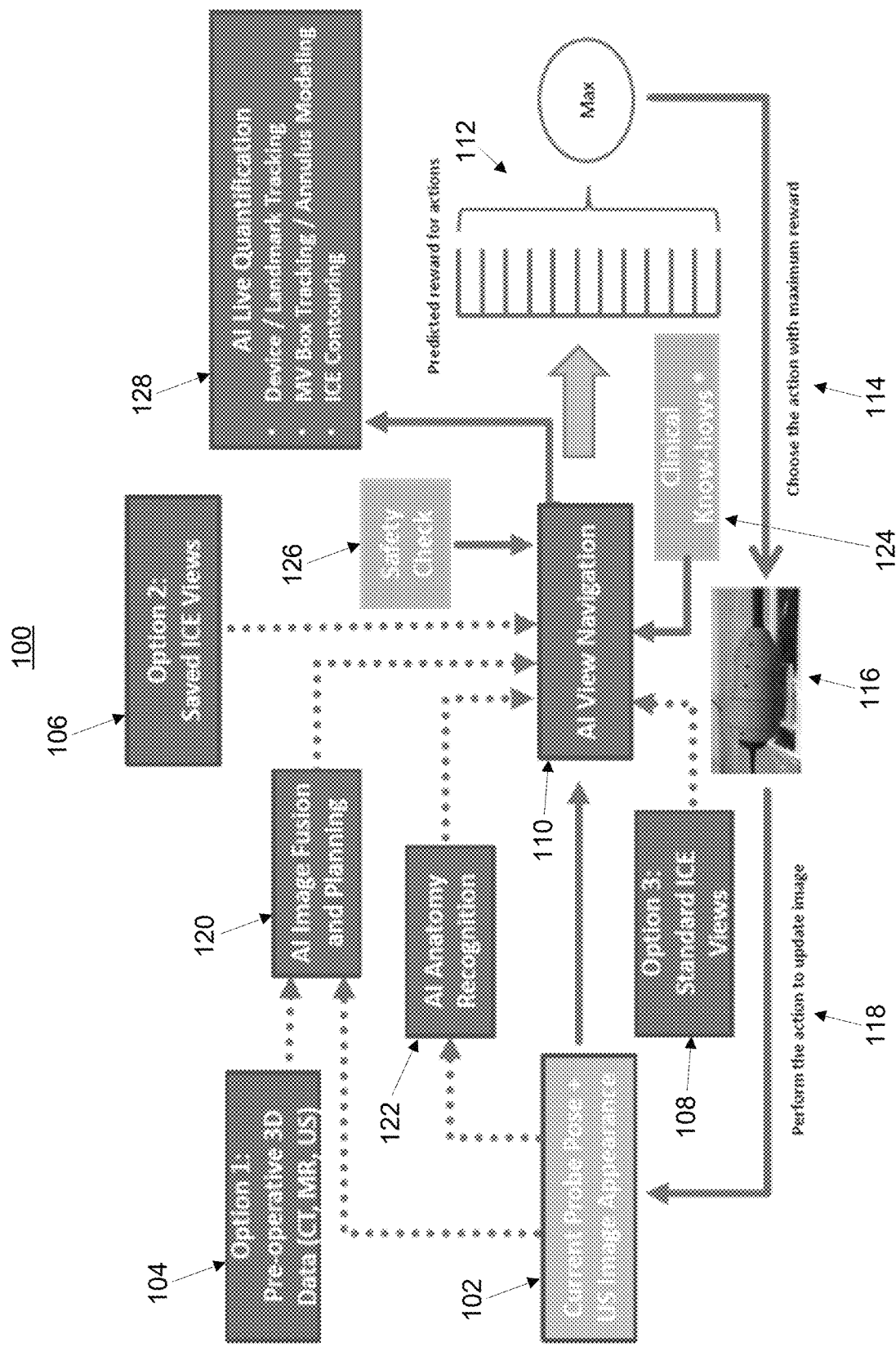
FIG. 1 shows a framework for automatically navigating a catheter using a robotic catheter navigation system for performing a medical procedure, in accordance with one or more embodiments.
Figure 2:
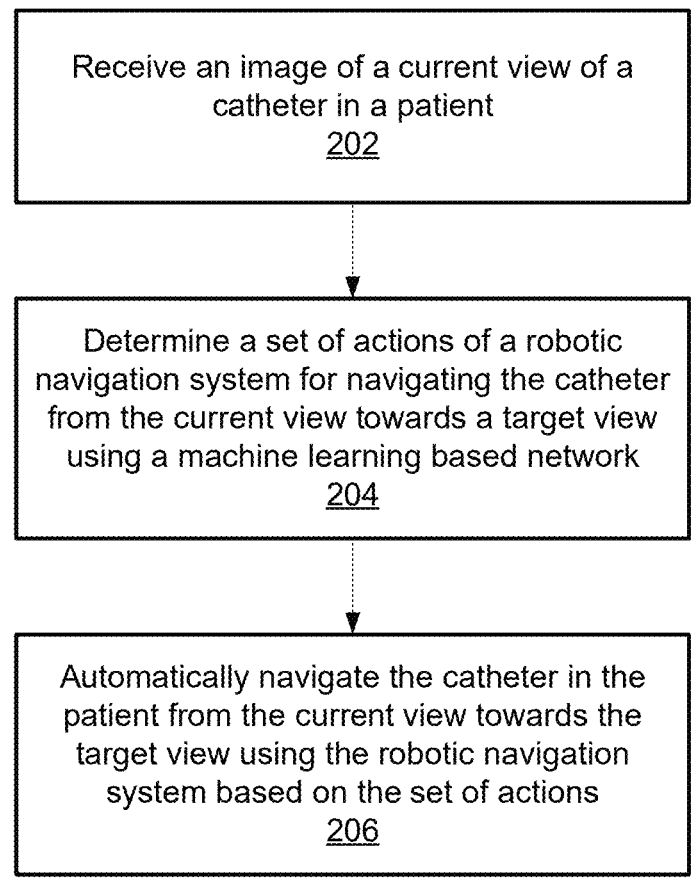
FIG. 2 shows a method for automatically navigating a catheter using a robotic catheter navigation system for performing a medical procedure, in accordance with one or more embodiments.

FIG. 1 shows a framework 100 for automatically navigating a catheter using a robotic catheter navigation system for performing a medical procedure, in accordance with one or more embodiments. FIG. 1 will be further described below with reference to FIGS. 1-10. FIG. 2 shows a method 200 for automatically navigating a catheter using a robotic catheter navigation system for performing a medical procedure, in accordance with one or more embodiments. The steps of method 200 may be performed by one or more suitable computing devices, such as, e.g., computer 1302 of FIG. 13. Framework 100 of FIG. 1 and method 200 of FIG. 2 may be performed for automatically navigating a catheter using a robotic catheter navigation system for various medical procedures, such as, e.g., ICE, TEE (transesophageal echo), etc.

At step 202 of FIG. 2, an image of a current view of a catheter in a patient is received. The current view of the catheter refers to the view of the catheter at its current location. In one example, as shown in FIG. 1, the image of the current view may be included in current probe pose and US (ultrasound) image appearance 102 in framework 100.

The image of the current view may be of any suitable modality, such as, e.g., CT (computed tomography), MRI (magnetic resonance imaging), US, x-ray, or any other medical imaging modality or combinations of medical imaging modalities. The image of the current view may comprise 2D (two dimensional) images and/or 3D (three dimensional) volumes, and may comprise a single input medical image or a plurality of input medical images. The image of the current view may be received directly from an image acquisition device, such as, e.g., a CT scanner, as the image is acquired, or can be received by loading previously acquired medical images from a storage or memory of a computer system (e.g., a PACS (picture archiving and communication system)) or receiving medical images that have been transmitted from a remote computer system.

At step 204 of FIG. 2, a set of actions of a robotic navigation system is determined for navigating the catheter from the current view towards a target view using a machine learning based network. The robotic catheter navigation system may include any robotic catheter navigation system able to manipulate all 12 degrees of freedom of the catheter. The 12 degrees of freedom of the catheter represents all possible actions for moving the catheter: positive and negative translation in the X, Y, Z plane and clockwise and counterclockwise rotation in the yaw, pitch, and roll axes. The set of actions is selected from the possible actions for moving the catheter.

In a first embodiment, the target view is a view depicted in preoperative medical images. For example, as shown in FIG. 1, the set of actions is determined to navigate to pre-operative 3D data (e.g., CT, MR, US images), shown as option 1 in framework 100. Navigating towards a target view depicted in preoperative medical images is further described below with respect to FIG. 3.

In a second embodiment, the target view is a view depicted in a saved medical image previously acquired during the same medical procedure for which the catheter is being navigated. For example, as shown in FIG. 1, the set of actions is determined to navigate to saved ICE views, shown as option 2 in framework 100. Navigating towards a target view depicted in a saved medical image is further described below with respect to FIG. 4.

In a third embodiment, the target view is a view of a standard anatomical view. The standard anatomical view may be a clinically significant view, such as, e.g., the A4C (apical 4 chamber) of the heart. For example, as shown in FIG. 1, the set of actions is determined to navigate to standard ICE views 108, shown as option 3 in framework 100. Navigating towards a target view depicted in a medical image of a standard view is further described below with respect to FIG. 6.

In one embodiment, the set of actions is determined using a machine learning based network to predict a reward for each possible action for moving the catheter. For example, an AI (artificial intelligence) agent may be trained with deep reinforcement learning to predict a reward for each possible action of the robotic navigation system and the action or actions with the maximum reward is select as the set of actions. In one example, as shown in FIG. 1, AI view navigation system 110 predicts a reward 112 for each possible action and the action with the maximum reward is chosen 114 for navigating the catheter using the robotic catheter navigation system 116. Determining the set of actions using the machine learning based network is further described below with respect to FIG. 7.

At step 206 of FIG. 2, the catheter is automatically navigated in the patient from the current view towards the target view using the robotic navigation system based on the set of actions. In one example, as shown in FIG. 1, the robotic navigation system 116 performs 118 the action with the highest reward. The current probe pose and US image appearance 102 is then updated and AI view navigation 110 may iteratively determine a next action for navigating the catheter towards the target view. Accordingly, method 200 may be iteratively repeated for any number of iterations (e.g., a predetermined number of iterations) to navigate the catheter towards the target view.

Figure 3:
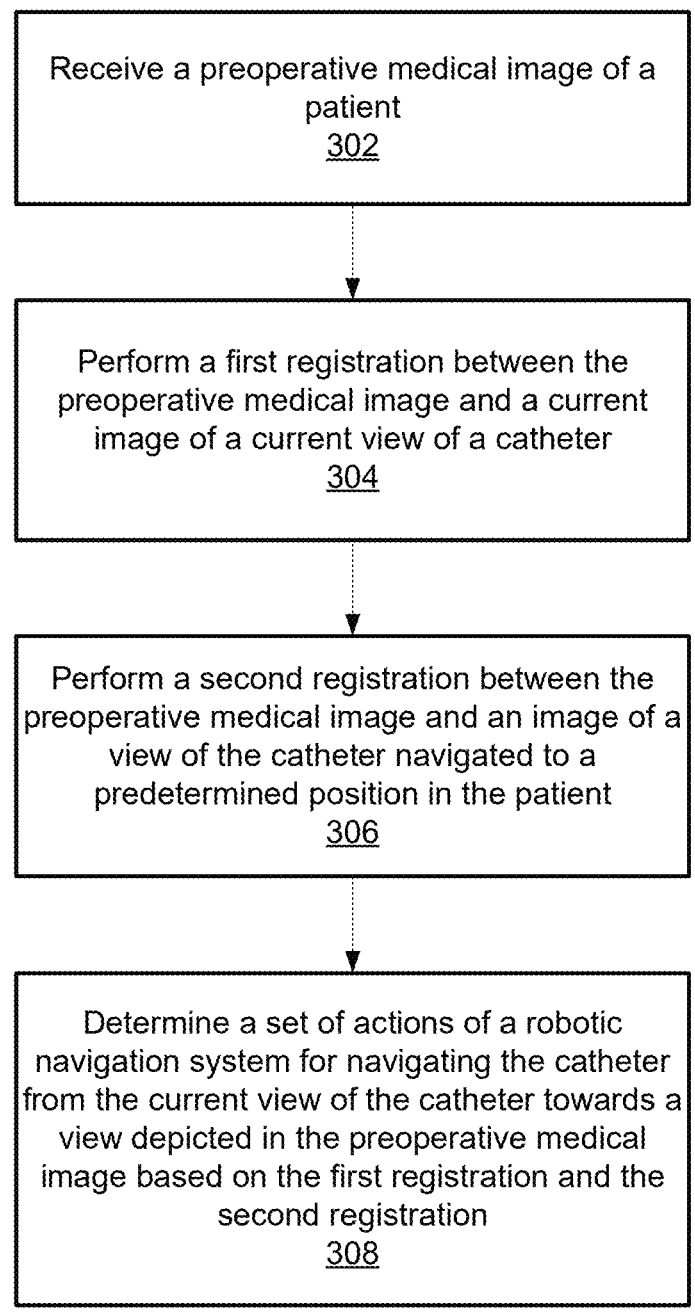
FIG. 3 shows a method for navigating a catheter towards a target view depicted in preoperative medical images, in accordance with one or more medical images.

FIG. 3 shows a method 300 for navigating a catheter towards a target view depicted in preoperative medical images, in accordance with one or more medical images. The steps of method 300 may be performed by one or more suitable computing devices, such as, e.g., computer 1302 of FIG. 13. In one embodiment, method 300 may be performed at step 204 of FIG. 2. Method 300 of FIG. 3 corresponds to option 1 in FIG. 1.

At step 302 of FIG. 3, a preoperative medical image of a patient is received. The preoperative medical image is a medical image acquired for planning the same medical procedure for which the catheter is being navigated (e.g., the medical procedure performed in framework 100 of FIG. 1 or method 200 of FIG. 2). In one example, as shown in FIG. 1, the preoperative medical image is pre-operative 3D data 104 in framework 100.

The preoperative medical image may be of any suitable modality, such as, e.g., CT, MRI, US, x-ray, or any other medical imaging modality or combinations of medical imaging modalities. The preoperative medical image may comprise 2D images and/or 3D volumes, and may comprise a single input medical image or a plurality of input medical images. The preoperative medical image may be received directly from an image acquisition device, such as, e.g., a CT scanner, as the image is acquired, or can be received by loading previously acquired medical images from a storage or memory of a computer system (e.g., a PACS) or receiving medical images that have been transmitted from a remote computer system.

At step 304 of FIG. 3, a first registration between the preoperative medical image and a current image of a current view of a catheter is performed. In one example, as shown in FIG. 1, the first registration is performed by AI image fusion and planning system 120 of framework 100. The current image may be the current image received at step 202 of FIG. 2. The current view of the catheter refers to the view of the catheter at its current location. The first registration may be performed as, e.g., CT-to-x-ray registration (e.g., 2D/3D registration), CT-to-DynaCT registration (3D/3D registration), or CT-to-US registration using any suitable approach. For example, the first registration may be performed based on known image-based registration techniques or known deep learning registration techniques. The first registration provides the location of the catheter with respect to the preoperative image.

At step 306 of FIG. 3, a second registration between the preoperative medical image and an image of a view of the catheter navigated to a predetermined position in the patient is performed. In one example, as shown in FIG. 1, the second registration is performed by AI image fusion and planning system 120 of framework 100. After acquiring the current image (for step 304), the catheter is navigated to the predetermined position in the patient to acquire the image. The predetermined position in the patient may be a standard or otherwise known position and may have anatomical landmarks. The second registration may be performed as described with respect to the first registration at step 304. The second registration provides the location of the catheter with respect to the patient's anatomy and is only performed when the preoperative medical image is available for defining the target view.

In some embodiments, instead of performing the second registration, the location of the catheter with respect to the patient's anatomy can be determined by acquiring two x-ray images to determine the precise pose estimation of the tip of the catheter, which can then be automatically mapped to the preoperative image (as determined at step 304). In another alternative embodiment, robotic sensors or other sensors at a tip of the catheter (e.g., inertial measurement units or fiber Bragg grating sensors) to geolocalize the tip of the catheter.

At step 308 of FIG. 3, a set of actions of a robotic navigation system is determined for navigating the catheter from the current view of the catheter towards a view depicted in the preoperative medical image based on the first registration and the second registration. In one example, as shown in FIG. 1, the set of actions is determined by AI view navigation system 110 of framework 100. The set of actions may be determined using a machine learning based network as further described below with respect to FIG. 7.

In one embodiment, an AI (artificial intelligence) agent is trained for multi-task position estimation to estimate the relative position of current view to each target view depicted in the preoperative medical image based on the first registration and the second registration. The AI agent is trained using DRL (Deep Reinforcement Learning) to continuously move closer to the target view in each step. To further boost the accuracy of the target view localization obtained from multi-task position estimation, local search is then conducted via a deep action learning model.

Figure 4:
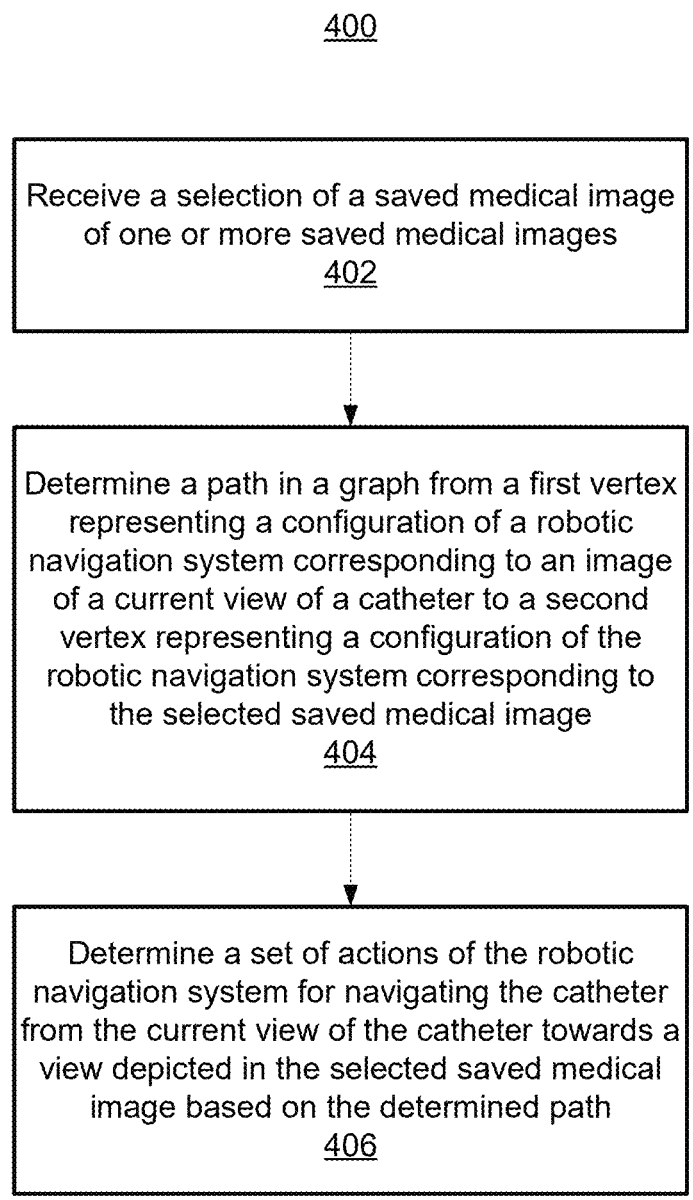
FIG. 4 shows a method for navigating a catheter towards a target view depicted in saved medical image, in accordance with one or more medical images.

FIG. 4 shows a method 400 for navigating a catheter towards a target view depicted in saved medical image, in accordance with one or more medical images. The steps of method 400 may be performed by one or more suitable computing devices, such as, e.g., computer 1302 of FIG. 13. In one embodiment, method 400 may be performed at step 204 of FIG. 2. Method 400 of FIG. 4 corresponds to option 2 of FIG. 1.

At step 402 of FIG. 4, a selection of a saved medical image of one or more saved medical images is received. The one or more saved medical images were previously acquired and saved during the same medical procedure for which the catheter is being navigated (e.g., the medical procedure performed in framework 100 of FIG. 1 or method 200 of FIG. 2). In particular, during a prior initial stage of the medical procedure, a user navigates the catheter in the patient to one or more anatomical views of interest and user input is received from the user to acquire and save the one or more saved medical images in memory or storage as bookmarks, thereby creating a library of views that are easily reproducible. During a next stage of the medical procedure, at step 402, the user selects one of the one or more saved medical images to navigate the catheter to view the one or more anatomical views of interest. In one example, as shown in FIG. 1, the one or more saved medical images are saved ICE views 106 in framework 100.

The saved medical images may be of any suitable modality, such as, e.g., CT, MRI, US, x-ray, or any other medical imaging modality or combinations of medical imaging modalities. The saved medical images may comprise 2D images and/or 3D volumes, and may comprise a single input medical image or a plurality of input medical images. The saved medical images may be received directly from an image acquisition device, such as, e.g., a CT scanner, as the image is acquired, or can be received by loading previously acquired medical images from a storage or memory of a computer system (e.g., a PACS) or receiving medical images that have been transmitted from a remote computer system.

At step 404 of FIG. 4, a path in a graph is determined from a first vertex representing a configuration of a robotic navigation system corresponding to an image of a current view of a catheter to a second vertex representing a configuration of the robotic navigation system corresponding to the selected saved medical image.

Figure 5:
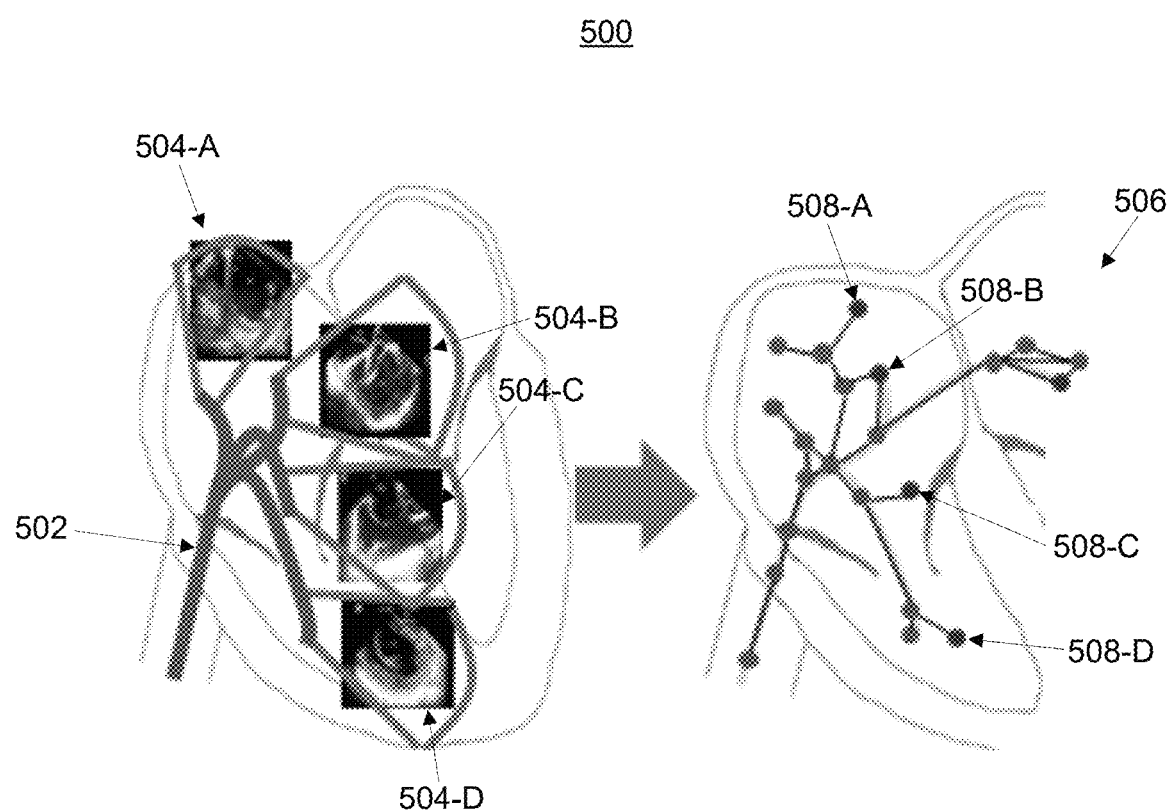
FIG. 5 shows a schematic diagram for generating a graph, in accordance with one or more embodiments.

The graph is generated during the prior initial stage of the medical procedure in substantially real time as the user navigates the catheter to the one or more anatomical views of interest. FIG. 5 shows a schematic diagram 500 for generating a graph, in accordance with one or more embodiments. During the prior initial stage of the medical procedure, the user navigates the catheter along paths 502 in a patient. User input is received to acquire and save images 504-A, 504-B, 504-C, and 504-D (collectively referred to as saved images 504) depicting anatomical views of interest. Graph 506 is generated comprising vertices or nodes (shown as dots in FIG. 5) and edges connecting the vertices.

Formally, let G(V,E) represent a topological graph 506 in which V is a set of vertices and E is edges connecting the vertices in the configuration space of the robotic navigation system. Vertices V represent configurations q of the robotic navigation system. As shown in FIG. 5, vertices 508-A, 508-B, 508-C, and 508-D (collectively referred to as vertices 508) correspond to configurations q (i.e., motor states) of the robotic navigation system at the time when user input is received for acquiring and saving the saved images 504. Graph G 506 is generated during a generation phase in substantially real time by inserting vertices V according to a density parameter a so that vertices V are not spaced too closely. Density parameter a is a user-defined parameter for the resolution of the search space. A larger density parameter a results in a faster search, however the safety of the path would not be guaranteed as larger steps along the path could result in collisions with the anatomy. During a query phase (at step 404 of FIG. 4), a pair of configurations is generated upon user request (i.e., selection of a saved medical image at step 402 of FIG. 4) comprising a start configuration $q_s$ and a target configuration $q_t$. The start configuration $q_s$ corresponds to the current configuration of the robotic navigation system and the target configuration $q_t$ corresponds to the configuration of the robotic navigation system for the selected saved medical image. Since each configuration is represented as vertices V in graph G 506, a discrete search algorithm may be applied to determine a sequence of edges E that forms a path between the start configuration $q_s$ and the target configuration $q_t$ in graph G 506. The discrete search algorithm may be any suitable algorithm for determining a path between the start configuration $q_s$ and the target configuration $q_t$, such as, e.g., A* search algorithm. If the current position of the catheter does not correspond to a vertex of the graph G 506, a new node is added to the graph G 506 for the current position (assuming that the density parameter a is satisfied).

At step 406 of FIG. 4, a set of actions of the robotic navigation system is determined for navigating the catheter from the current view of the catheter towards a view depicted in the selected saved medical image based on the determined path. The set of motions is given based on the targeted view depicted in the selected saved medical image. Since the current state (one node) is known, the path (set of motions) to the target view is identified. Method 400 in FIG. 4 has all possible trajectories that were previously produced to easily reproduce a path. In one example, as shown in FIG. 1, the set of actions is determined by AI view navigation system 110 of framework 100. The set of actions may be determined using a machine learning based network as further described below with respect to FIG. 7.

In one embodiment, local view refinement may be applied by comparing an image of the current view of the catheter to the selected saved medical image to generate a real time image similarity measure. The image similarity measure may be any suitable measure, such as, e.g., a normalized cross correlation, a structural similarity measure, a Dice similarity coefficient, or any other suitable metric. The real time image similarity measure is treated as an objective function, where the catheter is manipulated to maximize or satisfy an image similarity threshold between the image of the current view of the catheter and the selected saved medical image. This approach may be implemented in series, whereby the catheter is manipulated towards a target view based on the determined path and the catheter positioning is incrementally refined (e.g., by repeating iteratively repeating method 200) until a minimum image similarity criterion is satisfied.

Figure 6:
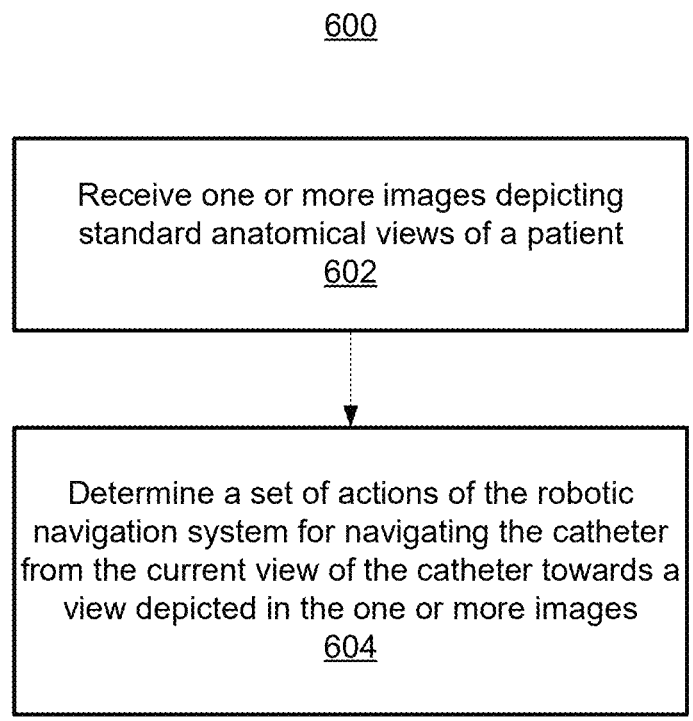
FIG. 6 shows a method for navigating a catheter towards a standard anatomical view of a patient, in accordance with one or more medical images.

FIG. 6 shows a method 600 for navigating a catheter to a standard anatomical view of a patient, in accordance with one or more medical images. The steps of method 600 may be performed by one or more suitable computing devices, such as, e.g., computer 1302 of FIG. 13. In one embodiment, method 600 may be performed at step 204 of FIG. 2. Method 600 of FIG. 6 corresponds to option 3 of FIG. 1.

At step 602 of FIG. 6, one or more images depicting standard anatomical views of a patient are received. The standard anatomical views are clinically significant views of the patient. Exemplary standard anatomical views include PLAX (parasternal long axis), PSAX (parasternal short axis), A4C (apical 4 chamber), A3C (apical 3 chamber), A2C (apical 2 chamber), subcostal, and SSN (suprasternal). The standard anatomical views were not previously viewed or navigated to during the same medical procedure for which the catheter is being navigated (e.g., the medical procedure performed in framework 100 of FIG. 1 or method 200 of FIG. 2). In one example, as shown in FIG. 1, the one or more saved medical images are standard ICE views 108 in framework 100.

The one or more images depicting standard anatomical views may be of any suitable modality, such as, e.g., CT, MRI, US, x-ray, or any other medical imaging modality or combinations of medical imaging modalities. The one or more images may comprise 2D images and/or 3D volumes, and may comprise a single input medical image or a plurality of input medical images. The one or more images may be received directly from an image acquisition device, such as, e.g., a CT scanner, as the image is acquired, or can be received by loading previously acquired medical images from a storage or memory of a computer system (e.g., a PACS) or receiving medical images that have been transmitted from a remote computer system.

At step 604 of FIG. 6, a set of actions of a robotic navigation system is determined for navigating a catheter from a current view to the one or more images depicting the standard anatomical views using a machine learning based network. In one example, as shown in FIG. 1, the set of actions is determined by AI view navigation system 110 of framework 100. The set of actions may be determined using a machine learning based network as further described below with respect to FIG. 7.

Figure 7:
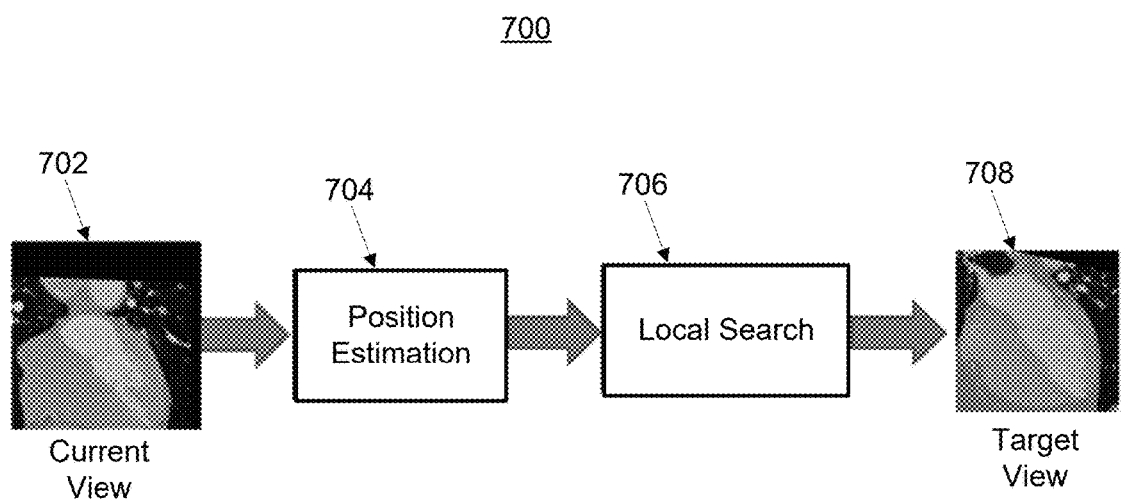
FIG. 7 shows a workflow for determining a set of actions of a robotic navigation system for navigating a catheter from a current view towards a target view, in accordance with one or more embodiments.

FIG. 7 shows a workflow 700 for determining a set of actions of a robotic navigation system for navigating a catheter from a current view towards a target view, in accordance with one or more embodiments. In one example, workflow 700 may be performed by AI view navigation system 110 of FIG. 1. Workflow 700 may be performed to determine a set of actions of a robotic navigation system at step 204 of FIG. 2, step 308 of FIG. 3, step 406 of FIG. 4, or step 604 of FIG. 6. As shown in workflow 700, a set of actions for navigating a catheter from a current view 702 towards one or more target views 708 according to a position estimation component 704 and a local search component 706.

Figure 8:
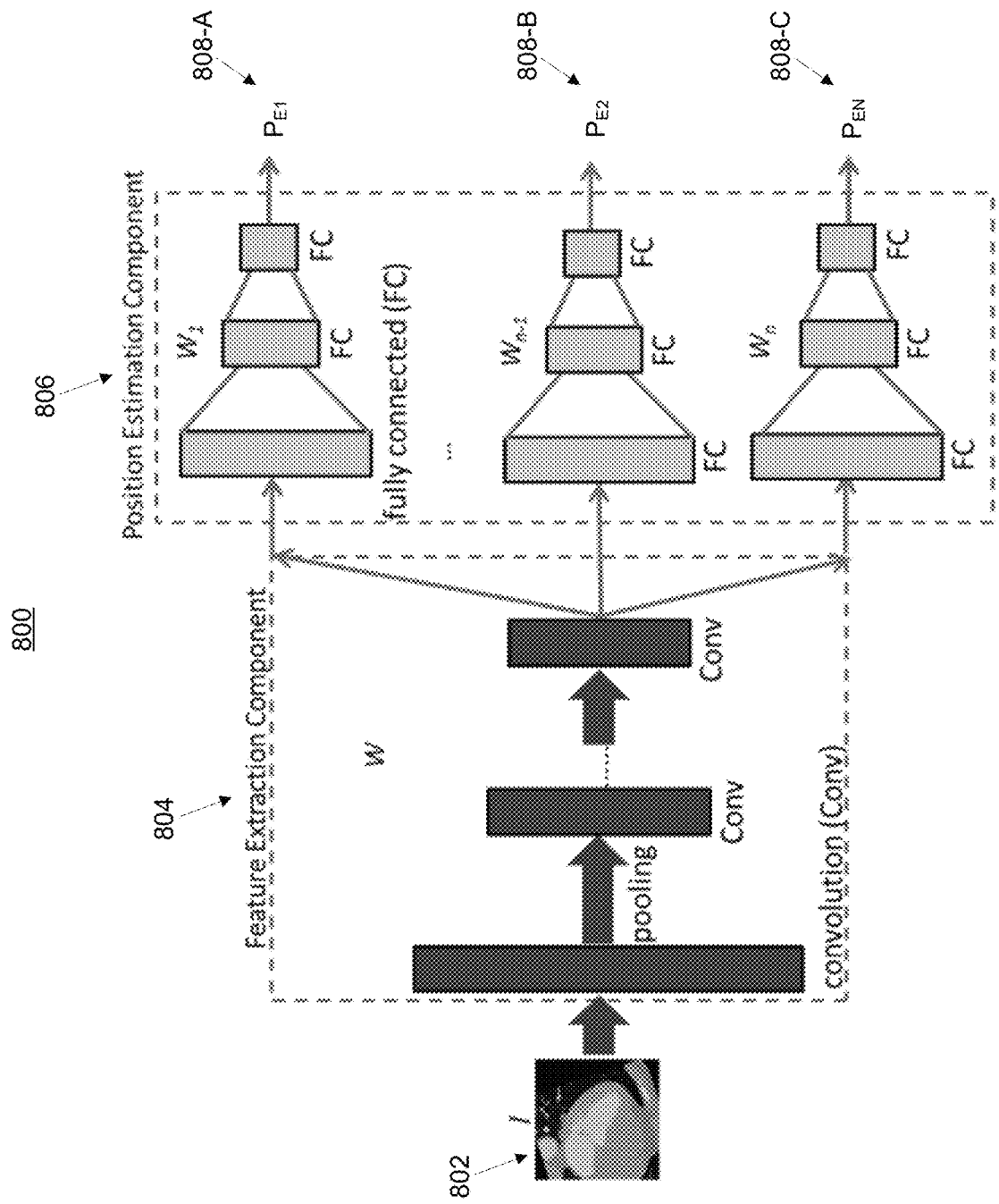
FIG. 8 shows network architecture of a deep learning model for estimating the relative position of a current view of a catheter with respect to one or more target views, in accordance with one or more embodiments.

Position estimation component 704 estimates the relative position of current view 702 with respect to the one or more target views 708. FIG. 8 shows network architecture 800 of a deep learning model for estimating the relative position of a current view of a catheter with respect to one or more target views, in accordance with one or more embodiments. Considering the close-to-deterministic human cardiac structure, it is possible to learn the relative position of the current view to all target views simultaneously via multi-task learning. Given image I 802 of the current view of the catheter and N target views with relative positions denoted as $P_{E1}$ 808-A, $P_{E2}$ 808-B, and $P_{EN}$ 808-N (collectively referred to as relative positions 808), network architecture 800 comprises a feature extraction component 804 and a position estimation component 806. Feature extraction component 804 comprises convolution (conv) layers and pooling layers and is parameterized by W to extract latent features from image I 802. Position estimation component 806 comprises N branches for respectively estimating relative positions 808 of image I 802. Each branch of position estimation component 806 comprises FC (fully connected) layers and is parameterized by $\{W_i\}_{i=1}^{n}$. The multi-task model training object may be defined according to the following objective:

$$\min_{W,W_1,W_2,\ldots,W_N} \frac{1}{N}\sum_{i=1}^{n} \|P_i - f_{W,W_i}(I)\|^2 \qquad \text{(Equation 1)}$$

Comparing the training of the deep learning model of network architecture 800 for each target view individually, the multi-task model has the following advantages. As the relative position of all target views are highly correlated, using all information in the supervised learning can boost the accuracy of predicting each one of $P_{E1}$ 808-A, $P_{E2}$ 808-B, and $P_{EN}$ 808-N. Because the feature extraction component is shared by all position prediction components, the embodiments described in FIG. 8 are more memory efficient than training N models for estimating the relative position to the N target views separately.

Local search component 706 of FIG. 7 may be learned via deep reinforce learning to train AI (artificial intelligence) agents to predict proper rewards to move the catheter closer to the target view in each step. Such rewards may be predicted, for example, using known techniques.

In one embodiment, the spatial relationship the different target views may be further leveraged during training. For example, only probe rotation is needed in order to move the catheter from the target view of A4C to A3C. Suppose the A4C view has been acquired according to the methods described above. To predict the rotation parameter from the A4C view to the A3C view, a convolutional neural network may be learned according to the following objective:

$$\min_{W} \frac{1}{N}\sum_{i=0}^{n} \|A_i - f_W(I_i) - \mu_{A4C-A3C}\|^2 \qquad \text{(Equation 2)}$$

where $A_i$ is the ground=truth rotation parameter of training image $I_i$ and $\mu_{A4C-A3C}$ is the average rotation angle from A4C to A3C, which may be learned statistically from training samples. Empirically, using $\mu_{A4C-A3C}$ as prior knowledge can significantly improve the model prediction accuracy. The training samples may be acquired via various approaches. For example, the training samples may be acquired as simulations of US images from other 3D modalities (e.g., CT, MR, etc.) that have a global view of human anatomy over a large population of patients. In another example, the training samples may be acquired via synchronized acquisition of US images with recorded catheter positions over a large population of patients and a large variation of catheter positions. Such training samples may be used for offline training. In a further example, the training samples may be acquired by online update of the agent over a smaller number of patients starting from the model trained offline.

In one embodiment, during navigation of the catheter (e.g., during step 206 of FIG. 2), the current view of the catheter may be automatically classified as being a certain standard anatomical view (e.g., PLAX, PSAX, A4C, A3C, A2C, subcostal, or SSN) and anatomical objects of interest (e.g., the atriums, ventricles, pulmonary veins, left atrial appendages, etc.) shown in the current view of the catheter may be identified and the classification of the current view and the identified anatomical objects of interest may be identified in the current view. In one example, as shown in FIG. 1, the classification of the current view of the catheter and the identification and labelling of the anatomical objects of interest may be performed by AI anatomy recognition 122 of framework 100. In one embodiment, the classification of the current view and the labelling of the anatomical objects of interest may be performed using a machine learning based network. The classification of the current view and the labelling of the anatomical objects of interest facilitate the navigation of the catheter by recognizing anatomical objects of interest encountered during the navigation of the catheter and providing the recognized anatomical objects of interest to the AI agent for optimal planning of the next action. FIG. 9 shows exemplary views of a catheter with anatomical objects of interest labelled thereon, in accordance with one or more embodiment. In view 902, the LA (left atrium) and LAA (left atrium appendage) are labelled thereon. In view 904, the LA, LAA, and LSPV (left superior pulmonary vein) are labelled thereon.

In one embodiment, clinician knowledge can be incorporated in the training and execution of the AI agent employed for navigating the catheter using, for example, deep Q-learning from demonstrations. In one example, as shown in FIG. 1, clinical knowledge is represented as clinical know-hows 124 of framework 100. The clinician knowledge may comprise knowledge about the anatomy and common practice in path planning during specific procedures. An example of clinician knowledge may include that a typically ICE study starts at a home view obtained with a catheter placed in the mid-right atrium and the transducer in a neutral position facing the tricuspid valve. The home view provides imaging of the right atrium, tricuspid valve, right ventricle, and typically an oblique or short-axis view of the aortic valve. From the home view, clockwise rotation of the catheter brings into view the aortic valve in the long axis and the right ventricle outflow tract. Additional clockwise rotation allows visualization of the mitral valve and interatrial septum, with the left atrial appendage anteriorly and the coronary sinus posteriorly.

In one embodiment, a safety check may be performed using, for example, image-based approaches or sensor-based approaches. In one example, as shown in FIG. 1, the safety check may be performed by safety check 126 in framework 100. To perform the safety check, tissue boundaries in the neighborhood of the catheter (e.g., the ICE catheter and therapy catheters) are clearly delineated (e.g., by the user). Real-time tracking of the catheters is performed so that an adequate safety zone could be allocated during the navigation of the catheters. In the case of navigating the ICE catheter, an augmented anatomical view provided by the co-registered preoperative image is utilized to provide the relative position of the ICE catheter with respect to the patient's anatomy.

In one embodiment, live tracking and quantification is performed. In one example, as shown in FIG. 1, the live tracking and quantification may be performed by AI live quantification 128 of framework 100. Live quantification of patient anatomy and live tracking of therapy devices provides optimal guidance and monitoring of therapy delivery. FIG. 10 shows exemplary views of a catheter with live quantification of patient anatomy and live tracking of therapy devices identified thereon, in accordance with one or more embodiment. As shown in views 1002, for a left atrial appendage closure procedure, an LAA ostium model 1006 is shown to provide shape detection and tracking of its measurement over a cardiac cycle, which is important for device selection and therapy outcome prediction. As shown in views 1004, an atrium transseptal puncture needle is tracked by tracker 1008. Tracking of therapy devices in ICE images and its display in the context of the 3D roadmap created from either 4D ICE or co-registered preoperative volumetric images (e.g., CT, MR, US) could help monitor the device position during therapy. In addition, the identified and tracked therapy devices and/or anatomies of interest may be used to feed the control loop of the AI agents for navigating the ICE catheter so that the therapy devices or anatomies of interest are maintained in the center of the view or otherwise optimally positioned in the view during the procedure.

Embodiments described herein are described with respect to the claimed systems as well as with respect to the claimed methods. Features, advantages or alternative embodiments herein can be assigned to the other claimed objects and vice versa. In other words, claims for the systems can be improved with features described or claimed in the context of the methods. In this case, the functional features of the method are embodied by objective units of the providing system.

Furthermore, certain embodiments described herein are described with respect to methods and systems utilizing trained machine learning based networks (or models), as well as with respect to methods and systems for training machine learning based networks. Features, advantages or alternative embodiments herein can be assigned to the other claimed objects and vice versa. In other words, claims for methods and systems for training a machine learning based network can be improved with features described or claimed in context of the methods and systems for utilizing a trained machine learning based network, and vice versa.

In particular, the trained machine learning based networks applied in embodiments described herein can be adapted by the methods and systems for training the machine learning based networks. Furthermore, the input data of the trained machine learning based network can comprise advantageous features and embodiments of the training input data, and vice versa. Furthermore, the output data of the trained machine learning based network can comprise advantageous features and embodiments of the output training data, and vice versa.

In general, a trained machine learning based network mimics cognitive functions that humans associate with other human minds. In particular, by training based on training data, the trained machine learning based network is able to adapt to new circumstances and to detect and extrapolate patterns.

In general, parameters of a machine learning based network can be adapted by means of training. In particular, supervised training, semi-supervised training, unsupervised training, reinforcement learning and/or active learning can be used. Furthermore, representation learning (an alternative term is "feature learning") can be used. In particular, the parameters of the trained machine learning based network can be adapted iteratively by several steps of training.

In particular, a trained machine learning based network can comprise a neural network, a support vector machine, a decision tree, and/or a Bayesian network, and/or the trained machine learning based network can be based on k-means clustering, Q-learning, genetic algorithms, and/or association rules. In particular, a neural network can be a deep neural network, a convolutional neural network, or a convolutional deep neural network. Furthermore, a neural network can be an adversarial network, a deep adversarial network and/or a generative adversarial network.

Figure 11:
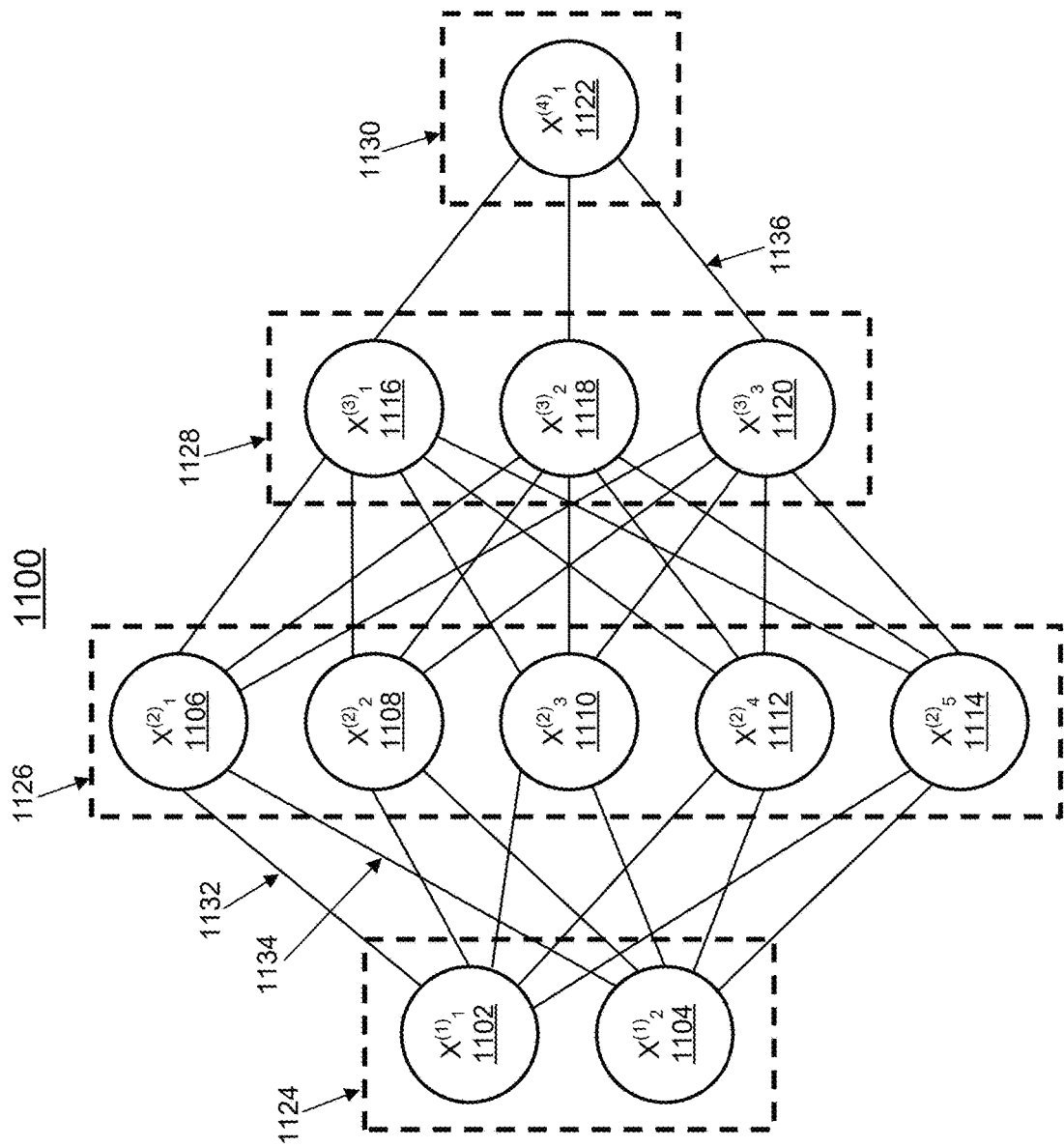
FIG. 11 shows an exemplary artificial neural network that may be used to implement one or more embodiments.

FIG. 11 shows an embodiment of an artificial neural network 1100, in accordance with one or more embodiments. Alternative terms for "artificial neural network" are "neural network", "artificial neural net" or "neural net". Machine learning networks described herein, such as, e.g., AI view navigation system 110 or AI anatomy recognition 122 of FIG. 1, the machine learning based network applied at step 204 of FIG. 2, the position estimation 704 of FIG. 7, and the network architecture 800 of FIG. 8, may be implemented using artificial neural network 1100.

The artificial neural network 1100 comprises nodes 1102-1122 and edges 1132, 1134, ..., 1136, wherein each edge 1132, 1134, ..., 1136 is a directed connection from a first node 1102-1122 to a second node 1102-1122. In general, the first node 1102-1122 and the second node 1102-1122 are different nodes 1102-1122, it is also possible that the first node 1102-1122 and the second node 1102-1122 are identical. For example, in FIG. 11, the edge 1132 is a directed connection from the node 1102 to the node 1106, and the edge 1134 is a directed connection from the node 1104 to the node 1106. An edge 1132, 1134, ..., 1136 from a first node 1102-1122 to a second node 1102-1122 is also denoted as "ingoing edge" for the second node 1102-1122 and as "outgoing edge" for the first node 1102-1122.

In this embodiment, the nodes 1102-1122 of the artificial neural network 1100 can be arranged in layers 1124-1130, wherein the layers can comprise an intrinsic order introduced by the edges 1132, 1134, ..., 1136 between the nodes 1102-1122. In particular, edges 1132, 1134, ..., 1136 can exist only between neighboring layers of nodes. In the embodiment shown in FIG. 11, there is an input layer 1124 comprising only nodes 1102 and 1104 without an incoming edge, an output layer 1130 comprising only node 1122 without outgoing edges, and hidden layers 1126, 1128 in-between the input layer 1124 and the output layer 1130. In general, the number of hidden layers 1126, 1128 can be chosen arbitrarily. The number of nodes 1102 and 1104 within the input layer 1124 usually relates to the number of input values of the neural network 1100, and the number of nodes 1122 within the output layer 1130 usually relates to the number of output values of the neural network 1100.

In particular, a (real) number can be assigned as a value to every node 1102-1122 of the neural network 1100. Here, $x^{(n)}_i$ denotes the value of the i-th node 1102-1122 of the n-th layer 1124-1130. The values of the nodes 1102-1122 of the input layer 1124 are equivalent to the input values of the neural network 1100, the value of the node 1122 of the output layer 1130 is equivalent to the output value of the neural network 1100. Furthermore, each edge 1132, 1134, ..., 1136 can comprise a weight being a real number, in particular, the weight is a real number within the interval $[-1, 1]$ or within the interval $[0, 1]$. Here, $w^{(m,n)}_{i,j}$ denotes the weight of the edge between the i-th node 1102-1122 of the m-th layer 1124-1130 and the j-th node 1102-1122 of the n-th layer 1124-1130. Furthermore, the abbreviation $w^{(n)}_{i,j}$ is defined for the weight $w^{(n,n+1)}_{i,j}$.

In particular, to calculate the output values of the neural network 1100, the input values are propagated through the neural network. In particular, the values of the nodes 1102-1122 of the (n+1)-th layer 1124-1130 can be calculated based on the values of the nodes 1102-1122 of the n-th layer 1124-1130 by $$x_j^{(n+1)} = f(\Sigma_i x_i^{(n)} \cdot w_{i,j}^{(n)}).$$

Herein, the function f is a transfer function (another term is "activation function"). Known transfer functions are step functions, sigmoid function (e.g. the logistic function, the generalized logistic function, the hyperbolic tangent, the Arctangent function, the error function, the smoothstep function) or rectifier functions. The transfer function is mainly used for normalization purposes.

In particular, the values are propagated layer-wise through the neural network, wherein values of the input layer 1124 are given by the input of the neural network 1100, wherein values of the first hidden layer 1126 can be calculated based on the values of the input layer 1124 of the neural network, wherein values of the second hidden layer 1128 can be calculated based in the values of the first hidden layer 1126, etc.

In order to set the values $w_{i,j}^{(m,n)}$ for the edges, the neural network 1100 has to be trained using training data. In particular, training data comprises training input data and training output data (denoted as $t_i$). For a training step, the neural network 1100 is applied to the training input data to generate calculated output data. In particular, the training data and the calculated output data comprise a number of values, said number being equal with the number of nodes of the output layer.

In particular, a comparison between the calculated output data and the training data is used to recursively adapt the weights within the neural network 1100 (backpropagation algorithm). In particular, the weights are changed according to $$w'^{(n)}_{i,j} = w_{i,j}^{(n)} - \gamma \cdot \delta_j^{(n)} \cdot x_i^{(n)}$$

wherein $\gamma$ is a learning rate, and the numbers $\delta_j^{(n)}$ can be recursively calculated as $$\delta_j^{(n)} = (\Sigma_k \delta_k^{(n+1)} \cdot w_{j,k}^{(n+1)}) \cdot f'(\Sigma_i x_i^{(n)} \cdot w_{i,j}^{(n)})$$

based on $\delta^{(n+1)}_j$, if the (n+1)-th layer is not the output layer, and $$\delta_j^{(n)} = (x_k^{n+1} - t_j^{(n+1)}) \cdot f'(\Sigma_i x_i^{(n)} \cdot w_{i,j}^{(n)})$$

if the (n+1)-th layer is the output layer 1130, wherein f' is the first derivative of the activation function, and $y^{(n+1)}_j$ is the comparison training value for the j-th node of the output layer 1130.

Figure 12:
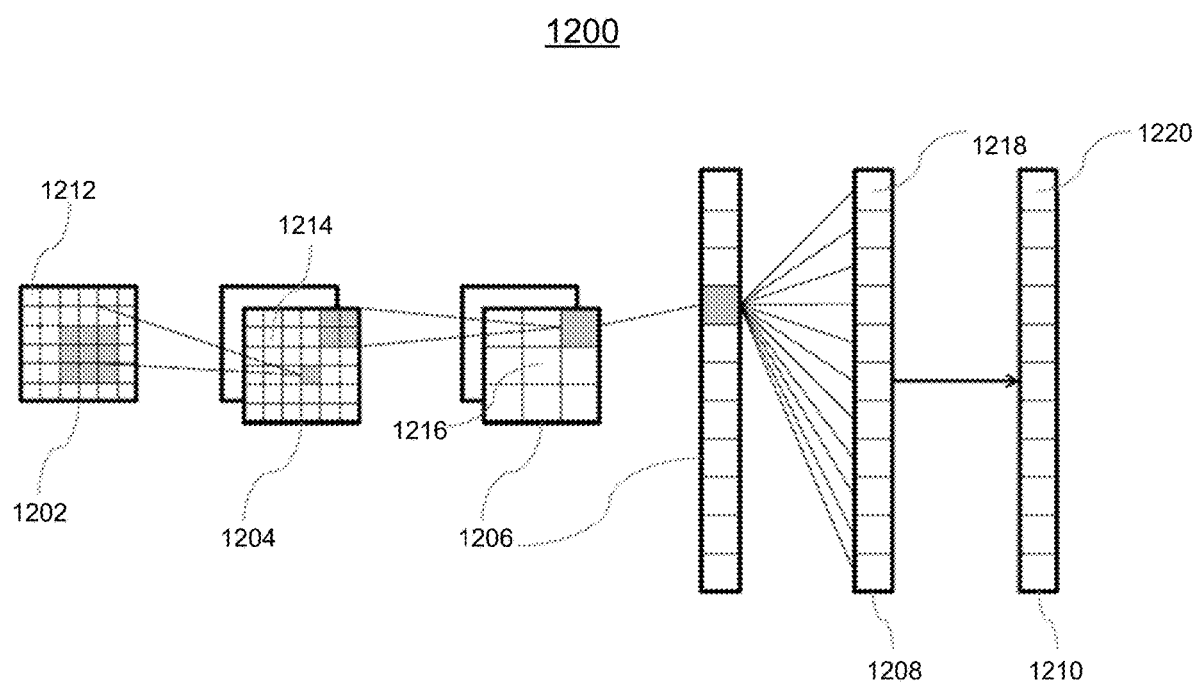
FIG. 12 shows a convolutional neural network that may be used to implement one or more embodiments.

FIG. 12 shows a convolutional neural network 1200, in accordance with one or more embodiments. Machine learning networks described herein, such as, e.g., AI view navigation system 110 or AI anatomy recognition 122 of FIG. 1, the machine learning based network applied at step 204 of FIG. 2, the position estimation 704 of FIG. 7, and the network architecture 800 of FIG. 8, may be implemented using convolutional neural network 1200.

In the embodiment shown in FIG. 12, the convolutional neural network comprises 1200 an input layer 1202, a convolutional layer 1204, a pooling layer 1206, a fully connected layer 1208, and an output layer 1210. Alternatively, the convolutional neural network 1200 can comprise several convolutional layers 1204, several pooling layers 1206, and several fully connected layers 1208, as well as other types of layers. The order of the layers can be chosen arbitrarily, usually fully connected layers 1208 are used as the last layers before the output layer 1210.

In particular, within a convolutional neural network 1200, the nodes 1212-1220 of one layer 1202-1210 can be considered to be arranged as a d-dimensional matrix or as a d-dimensional image. In particular, in the two-dimensional case the value of the node 1212-1220 indexed with i and j in the n-th layer 1202-1210 can be denoted as $x^{(n)}_{[i,j]}$. However, the arrangement of the nodes 1212-1220 of one layer 1202-1210 does not have an effect on the calculations executed within the convolutional neural network 1200 as such, since these are given solely by the structure and the weights of the edges.

In particular, a convolutional layer 1204 is characterized by the structure and the weights of the incoming edges forming a convolution operation based on a certain number of kernels. In particular, the structure and the weights of the incoming edges are chosen such that the values $x^{(n)}_k$ of the nodes 1214 of the convolutional layer 1204 are calculated as a convolution $x^{(n)}_k = K_k * x^{(n-1)}$ based on the values $x^{(n-1)}$ of the nodes 1212 of the preceding layer 1202, where the convolution * is defined in the two-dimensional case as $$x_k^{(n)}[i,j] = (K_k * x^{(n-1)})[i,j] = \Sigma_{i'} \Sigma_{j'} K_k[i',j'] \cdot x^{(n-1)}[i-i', j-j']$$

Here the k-th kernel $K_k$ is a d-dimensional matrix (in this embodiment a two-dimensional matrix), which is usually small compared to the number of nodes 1212-1218 (e.g. a 3×3 matrix, or a 5×5 matrix). In particular, this implies that the weights of the incoming edges are not independent, but chosen such that they produce said convolution equation. In particular, for a kernel being a 3×3 matrix, there are only 9 independent weights (each entry of the kernel matrix corresponding to one independent weight), irrespectively of the number of nodes 1212-1220 in the respective layer 1202-1210. In particular, for a convolutional layer 1204, the number of nodes 1214 in the convolutional layer is equivalent to the number of nodes 1212 in the preceding layer 1202 multiplied with the number of kernels.

If the nodes 1212 of the preceding layer 1202 are arranged as a d-dimensional matrix, using a plurality of kernels can be interpreted as adding a further dimension (denoted as "depth" dimension), so that the nodes 1214 of the convolutional layer 1204 are arranged as a (d+1)-dimensional matrix. If the nodes 1212 of the preceding layer 1202 are already arranged as a (d+1)-dimensional matrix comprising a depth dimension, using a plurality of kernels can be interpreted as expanding along the depth dimension, so that the nodes 1214 of the convolutional layer 1204 are arranged also as a (d+1)-dimensional matrix, wherein the size of the (d+1)-dimensional matrix with respect to the depth dimension is by a factor of the number of kernels larger than in the preceding layer 1202.

The advantage of using convolutional layers 1204 is that spatially local correlation of the input data can exploited by enforcing a local connectivity pattern between nodes of adjacent layers, in particular by each node being connected to only a small region of the nodes of the preceding layer.

In embodiment shown in FIG. 12, the input layer 1202 comprises 36 nodes 1212, arranged as a two-dimensional 6×6 matrix. The convolutional layer 1204 comprises 72 nodes 1214, arranged as two two-dimensional 6×6 matrices, each of the two matrices being the result of a convolution of the values of the input layer with a kernel. Equivalently, the nodes 1214 of the convolutional layer 1204 can be interpreted as arranges as a three-dimensional 6×6×2 matrix, wherein the last dimension is the depth dimension.

A pooling layer 1206 can be characterized by the structure and the weights of the incoming edges and the activation function of its nodes 1216 forming a pooling operation based on a non-linear pooling function f. For example, in the two dimensional case the values $x^{(n)}$ of the nodes 1216 of the pooling layer 1206 can be calculated based on the values $x^{(n-1)}$ of the nodes 1214 of the preceding layer 1204 as $$x^{(n)}[i,j]=f(x^{(n-1)}[id_1,jd_2], \quad . \quad . \quad . \quad ,$$
$$x^{(n-1)}[id_1+d_1-1,jd_2+d_2-1])$$

In other words, by using a pooling layer 1206, the number of nodes 1214, 1216 can be reduced, by replacing a number d1·d2 of neighboring nodes 1214 in the preceding layer 1204 with a single node 1216 being calculated as a function of the values of said number of neighboring nodes in the pooling layer. In particular, the pooling function f can be the max-function, the average or the L2-Norm. In particular, for a pooling layer 1206 the weights of the incoming edges are fixed and are not modified by training.

The advantage of using a pooling layer 1206 is that the number of nodes 1214, 1216 and the number of parameters is reduced. This leads to the amount of computation in the network being reduced and to a control of overfitting.

In the embodiment shown in FIG. 12, the pooling layer 1206 is a max-pooling, replacing four neighboring nodes with only one node, the value being the maximum of the values of the four neighboring nodes. The max-pooling is applied to each d-dimensional matrix of the previous layer; in this embodiment, the max-pooling is applied to each of the two two-dimensional matrices, reducing the number of nodes from 72 to 18.

A fully-connected layer 1208 can be characterized by the fact that a majority, in particular, all edges between nodes 1216 of the previous layer 1206 and the nodes 1218 of the fully-connected layer 1208 are present, and wherein the weight of each of the edges can be adjusted individually.

In this embodiment, the nodes 1216 of the preceding layer 1206 of the fully-connected layer 1208 are displayed both as two-dimensional matrices, and additionally as non-related nodes (indicated as a line of nodes, wherein the number of nodes was reduced for a better presentability). In this embodiment, the number of nodes 1218 in the fully connected layer 1208 is equal to the number of nodes 1216 in the preceding layer 1206. Alternatively, the number of nodes 1216, 1218 can differ.

Furthermore, in this embodiment, the values of the nodes 1220 of the output layer 1210 are determined by applying the Softmax function onto the values of the nodes 1218 of the preceding layer 1208. By applying the Softmax function, the sum the values of all nodes 1220 of the output layer 1210 is 1, and all values of all nodes 1220 of the output layer are real numbers between 0 and 1.

A convolutional neural network 1200 can also comprise a ReLU (rectified linear units) layer or activation layers with non-linear transfer functions. In particular, the number of nodes and the structure of the nodes contained in a ReLU layer is equivalent to the number of nodes and the structure of the nodes contained in the preceding layer. In particular, the value of each node in the ReLU layer is calculated by applying a rectifying function to the value of the corresponding node of the preceding layer.

The input and output of different convolutional neural network blocks can be wired using summation (residual/dense neural networks), element-wise multiplication (attention) or other differentiable operators. Therefore, the convolutional neural network architecture can be nested rather than being sequential if the whole pipeline is differentiable.

In particular, convolutional neural networks 1200 can be trained based on the backpropagation algorithm. For preventing overfitting, methods of regularization can be used, e.g. dropout of nodes 1212-1220, stochastic pooling, use of artificial data, weight decay based on the L1 or the L2 norm, or max norm constraints. Different loss functions can be combined for training the same neural network to reflect the joint training objectives. A subset of the neural network parameters can be excluded from optimization to retain the weights pretrained on another datasets.

Systems, apparatuses, and methods described herein may be implemented using digital circuitry, or using one or more computers using well-known computer processors, memory units, storage devices, computer software, and other components. Typically, a computer includes a processor for executing instructions and one or more memories for storing instructions and data. A computer may also include, or be coupled to, one or more mass storage devices, such as one or more magnetic disks, internal hard disks and removable disks, magneto-optical disks, optical disks, etc.

Systems, apparatus, and methods described herein may be implemented using computers operating in a client-server relationship. Typically, in such a system, the client computers are located remotely from the server computer and interact via a network. The client-server relationship may be defined and controlled by computer programs running on the respective client and server computers.

Systems, apparatus, and methods described herein may be implemented within a network-based cloud computing system. In such a network-based cloud computing system, a server or another processor that is connected to a network communicates with one or more client computers via a network. A client computer may communicate with the server via a network browser application residing and operating on the client computer, for example. A client computer may store data on the server and access the data via the network. A client computer may transmit requests for data, or requests for online services, to the server via the network. The server may perform requested services and provide data to the client computer(s). The server may also transmit data adapted to cause a client computer to perform a specified function, e.g., to perform a calculation, to display specified data on a screen, etc. For example, the server may transmit a request adapted to cause a client computer to perform one or more of the steps or functions of the methods and workflows described herein, including one or more of the steps or functions of FIGS. 1-4 and 6. Certain steps or functions of the methods and workflows described herein, including one or more of the steps or functions of FIGS. 1-4 and 6, may be performed by a server or by another processor in a network-based cloud-computing system. Certain steps or functions of the methods and workflows described herein, including one or more of the steps of FIGS. 1-4 and 6, may be performed by a client computer in a network-based cloud computing system. The steps or functions of the methods and workflows described herein, including one or more of the steps of FIGS. 1-4 and 6, may be performed by a server and/or by a client computer in a network-based cloud computing system, in any combination.

Systems, apparatus, and methods described herein may be implemented using a computer program product tangibly embodied in an information carrier, e.g., in a non-transitory machine-readable storage device, for execution by a programmable processor; and the method and workflow steps described herein, including one or more of the steps or functions of FIGS. 1-4 and 6, may be implemented using one or more computer programs that are executable by such a processor. A computer program is a set of computer program instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Figure 13:
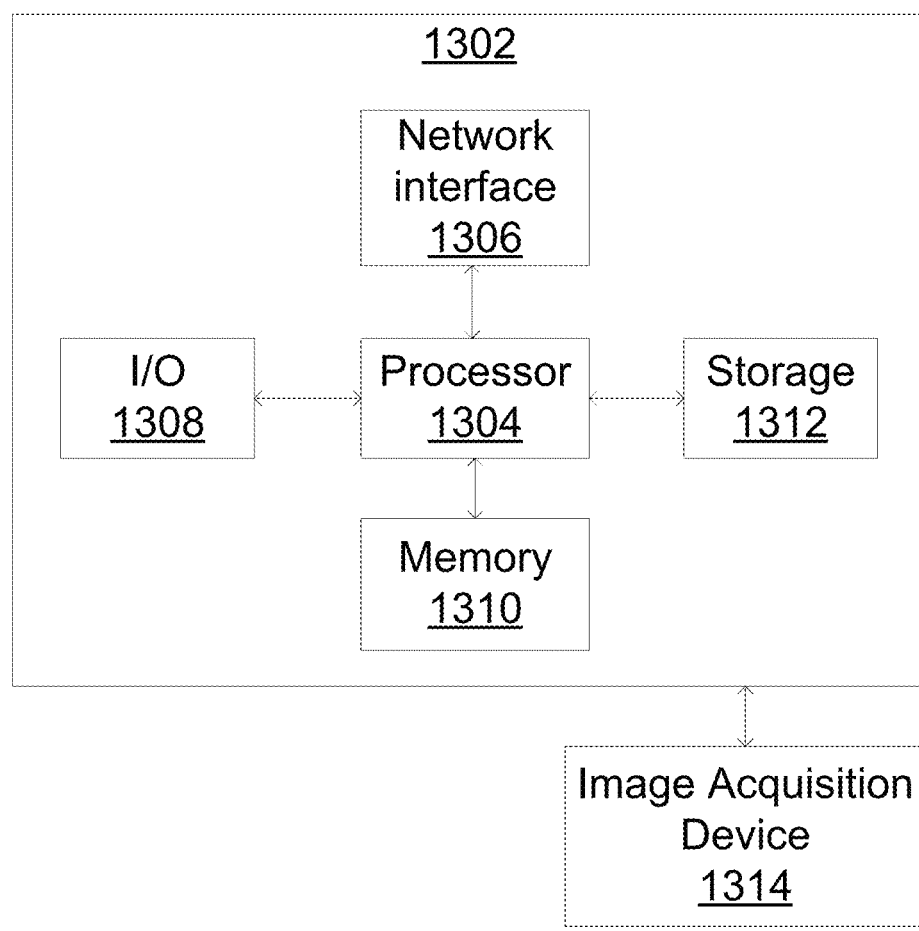
FIG. 13 shows a high-level block diagram of a computer that may be used to implement one or more embodiments.

A high-level block diagram of an example computer 1302 that may be used to implement systems, apparatus, and methods described herein is depicted in FIG. 13. Computer 1302 includes a processor 1304 operatively coupled to a data storage device 1312 and a memory 1310. Processor 1304 controls the overall operation of computer 1302 by executing computer program instructions that define such operations. The computer program instructions may be stored in data storage device 1312, or other computer readable medium, and loaded into memory 1310 when execution of the computer program instructions is desired. Thus, the method and workflow steps or functions of FIGS. 1-4 and 6 can be defined by the computer program instructions stored in memory 1310 and/or data storage device 1312 and controlled by processor 1304 executing the computer program instructions. For example, the computer program instructions can be implemented as computer executable code programmed by one skilled in the art to perform the method and workflow steps or functions of FIGS. 1-4 and 6. Accordingly, by executing the computer program instructions, the processor 1304 executes the method and workflow steps or functions of FIGS. 1-4 and 6. Computer 1302 may also include one or more network interfaces 1306 for communicating with other devices via a network. Computer 1302 may also include one or more input/output devices 1308 that enable user interaction with computer 1302 (e.g., display, keyboard, mouse, speakers, buttons, etc.).

Processor 1304 may include both general and special purpose microprocessors, and may be the sole processor or one of multiple processors of computer 1302. Processor 1304 may include one or more central processing units (CPUs), for example. Processor 1304, data storage device 1312, and/or memory 1310 may include, be supplemented by, or incorporated in, one or more application-specific integrated circuits (ASICs) and/or one or more field programmable gate arrays (FPGAs).

Data storage device 1312 and memory 1310 each include a tangible non-transitory computer readable storage medium. Data storage device 1312, and memory 1310, may each include high-speed random access memory, such as dynamic random access memory (DRAM), static random access memory (SRAM), double data rate synchronous dynamic random access memory (DDR RAM), or other random access solid state memory devices, and may include non-volatile memory, such as one or more magnetic disk storage devices such as internal hard disks and removable disks, magneto-optical disk storage devices, optical disk storage devices, flash memory devices, semiconductor memory devices, such as erasable programmable read-only memory (EPROM), electrically erasable programmable read-only memory (EEPROM), compact disc read-only memory (CD-ROM), digital versatile disc read-only memory (DVD-ROM) disks, or other non-volatile solid state storage devices.

Input/output devices 1308 may include peripherals, such as a printer, scanner, display screen, etc. For example, input/output devices 1308 may include a display device such as a cathode ray tube (CRT) or liquid crystal display (LCD) monitor for displaying information to the user, a keyboard, and a pointing device such as a mouse or a trackball by which the user can provide input to computer 1302.

An image acquisition device 1314 can be connected to the computer 1302 to input image data (e.g., medical images) to the computer 1302. It is possible to implement the image acquisition device 1314 and the computer 1302 as one device. It is also possible that the image acquisition device 1314 and the computer 1302 communicate wirelessly through a network. In a possible embodiment, the computer 1302 can be located remotely with respect to the image acquisition device 1314.

Any or all of the systems and apparatus discussed herein may be implemented using one or more computers such as computer 1302.

One skilled in the art will recognize that an implementation of an actual computer or computer system may have other structures and may contain other components as well, and that FIG. 13 is a high level representation of some of the components of such a computer for illustrative purposes.

The foregoing Detailed Description is to be understood as being in every respect illustrative and exemplary, but not restrictive, and the scope of the invention disclosed herein is not to be determined from the Detailed Description, but rather from the claims as interpreted according to the full breadth permitted by the patent laws. It is to be understood that the embodiments shown and described herein are only illustrative of the principles of the present invention and that various modifications may be implemented by those skilled in the art without departing from the scope and spirit of the invention. Those skilled in the art could implement various other feature combinations without departing from the scope and spirit of the invention.

The invention claimed is:

1. A computer-implemented method comprising:
receiving an image of a current view of a catheter in a patient and an image of a target view of the catheter in the patient;
determining a set of actions of a robotic navigation system for navigating the catheter from the current view towards the target view by:
performing a first registration between the image of the target view of the catheter and the image of the current view of the catheter,
performing a second registration between the image of the target view of the catheter and an image of a view of the catheter navigated to a predefined position in the patient, and
determining the set of actions for navigating the catheter from the current view towards the target view based on the first registration and the second registration by: 1) predicting, by a machine learning based network, a reward for each of a set of possible actions and 2) determining the set of actions from the set of possible actions based on the rewards; and
automatically navigating the catheter in the patient from the current view towards the target view using the robotic navigation system based on the set of actions.

2. The computer-implemented method of claim 1, wherein
the image of the target view of the catheter comprises a preoperative medical image of the target view of the catheter in the patient.

3. The computer-implemented method of claim 2, wherein the preoperative medical image is a medical image acquired for planning the same medical procedure for which the catheter is automatically navigated.

4. The computer-implemented method of claim 1, further comprising:
    comparing the image of the current view to an image of the target view to determine a similarity measure; and
    repeating the receiving, the determining, and the automatically navigating until a similarity threshold is satisfied.

5. The computer-implemented method of claim 1, further comprising:
    performing at least one of classification of current view of the catheter or identification of one or more anatomical objects of interest in the current view of the catheter; and
    identifying the at least one of the classification of the current view of the catheter or the identification of the one or more anatomical objects of interest in the current view of the catheter.

6. An apparatus comprising:
    a memory storing computer program instructions; and
    at least one processor configured to execute the computer program instructions, the computer program instructions configured to cause the at least one processor to perform operations comprising:
    receiving an image of a current view of a catheter in a patient and an image of a target view of the catheter in the patient;
    determining a set of actions of a robotic navigation system for navigating the catheter from the current view towards the target view by:
        performing a first registration between the image of the target view of the catheter and the image of the current view of the catheter,
        performing a second registration between the image of the target view of the catheter and an image of a view of the catheter navigated to a predefined position in the patient, and
        determining the set of actions for navigating the catheter from the current view towards the target view based on the first registration and the second registration by: 1) predicting, by a machine learning based network, a reward for each of a set of possible actions and 2) determining the set of actions from the set of possible actions based on the rewards; and
    automatically navigating the catheter in the patient from the current view towards the target view using the robotic navigation system based on the set of actions.

7. The apparatus of claim 6, wherein
    the image of the target view of the catheter comprises a preoperative medical image of the target view of the catheter in the patient.

8. The apparatus of claim 7, wherein the preoperative medical image is a medical image acquired for planning the same medical procedure for which the catheter is automatically navigated.

9. A non-transitory computer readable medium storing computer program instructions, the computer program instructions when executed by a processor cause the processor to perform operations comprising:
    receiving an image of a current view of a catheter in a patient and an image of a target view of the catheter in the patient;
    determining a set of actions of a robotic navigation system for navigating the catheter from the current view towards the target view by:
        performing a first registration between the image of the target view of the catheter and the image of the current view of the catheter,
        performing a second registration between the image of the target view of the catheter and an image of a view of the catheter navigated to a predefined position in the patient, and
        determining the set of actions for navigating the catheter from the current view towards the target view based on the first registration and the second registration by: 1) predicting, by a machine learning based network, a reward for each of a set of possible actions and 2) determining the set of actions from the set of possible actions based on the rewards; and
    automatically navigating the catheter in the patient from the current view towards the target view using the robotic navigation system based on the set of actions.

10. The non-transitory computer readable medium of claim 9, wherein
    the image of the target view of the catheter comprises a preoperative medical image of the target view of the catheter in the patient.

11. The non-transitory computer readable medium of claim 9, the operations further comprising:
    comparing the image of the current view to an image of the target view to determine a similarity measure; and
    repeating the receiving, the determining, and the automatically navigating until a similarity threshold is satisfied.

* * * * *